Oct. 22, 1935.  B. L. GATES  2,017,898
METHOD AND MEANS FOR AUTOMATICALLY CHANGING PHONOGRAPH RECORDS
Filed June 25, 1932  7 Sheets-Sheet 1
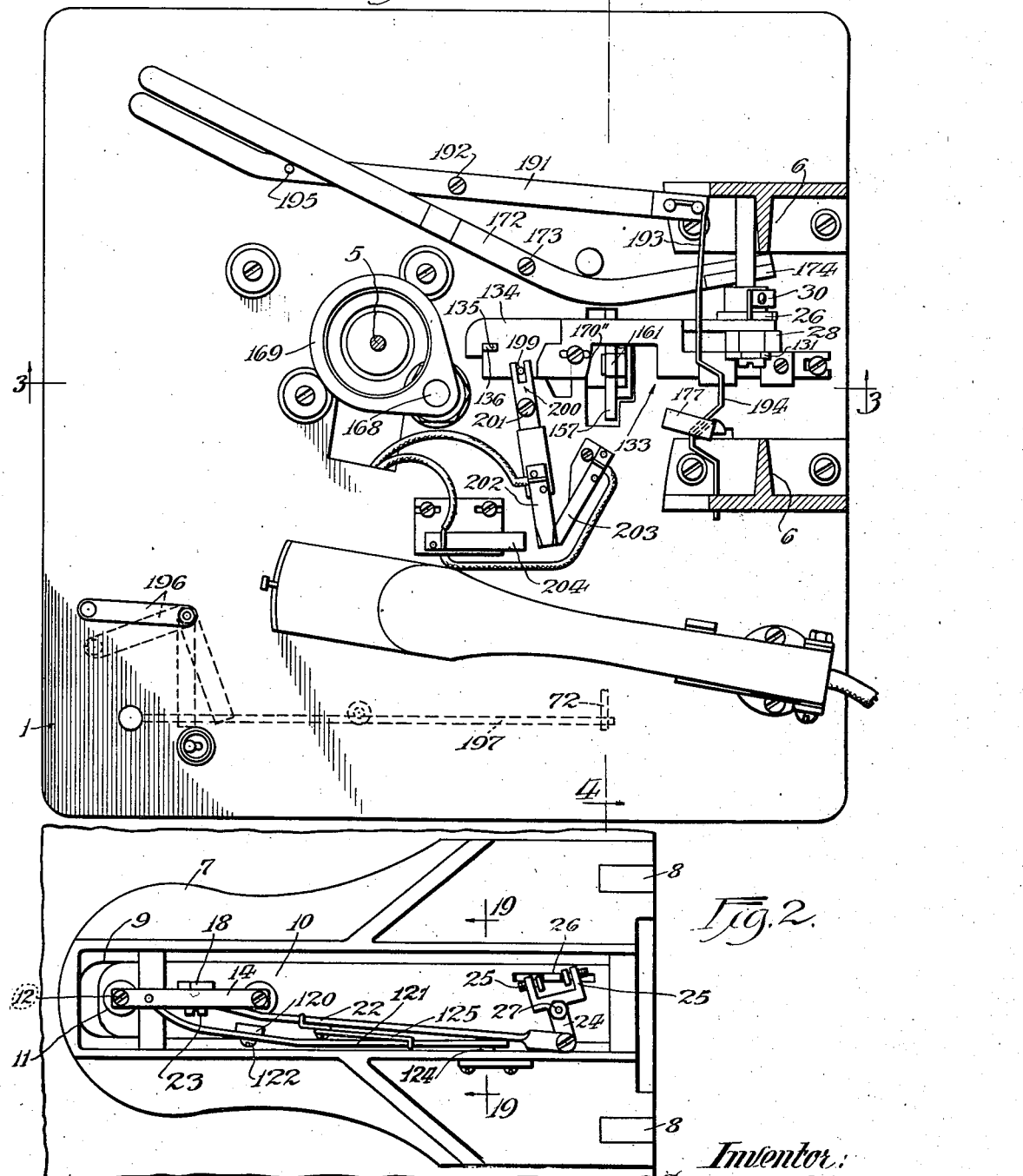

Oct. 22, 1935.  B. L. GATES  2,017,898
METHOD AND MEANS FOR AUTOMATICALLY CHANGING PHONOGRAPH RECORDS
Filed June 25, 1932  7 Sheets-Sheet 2
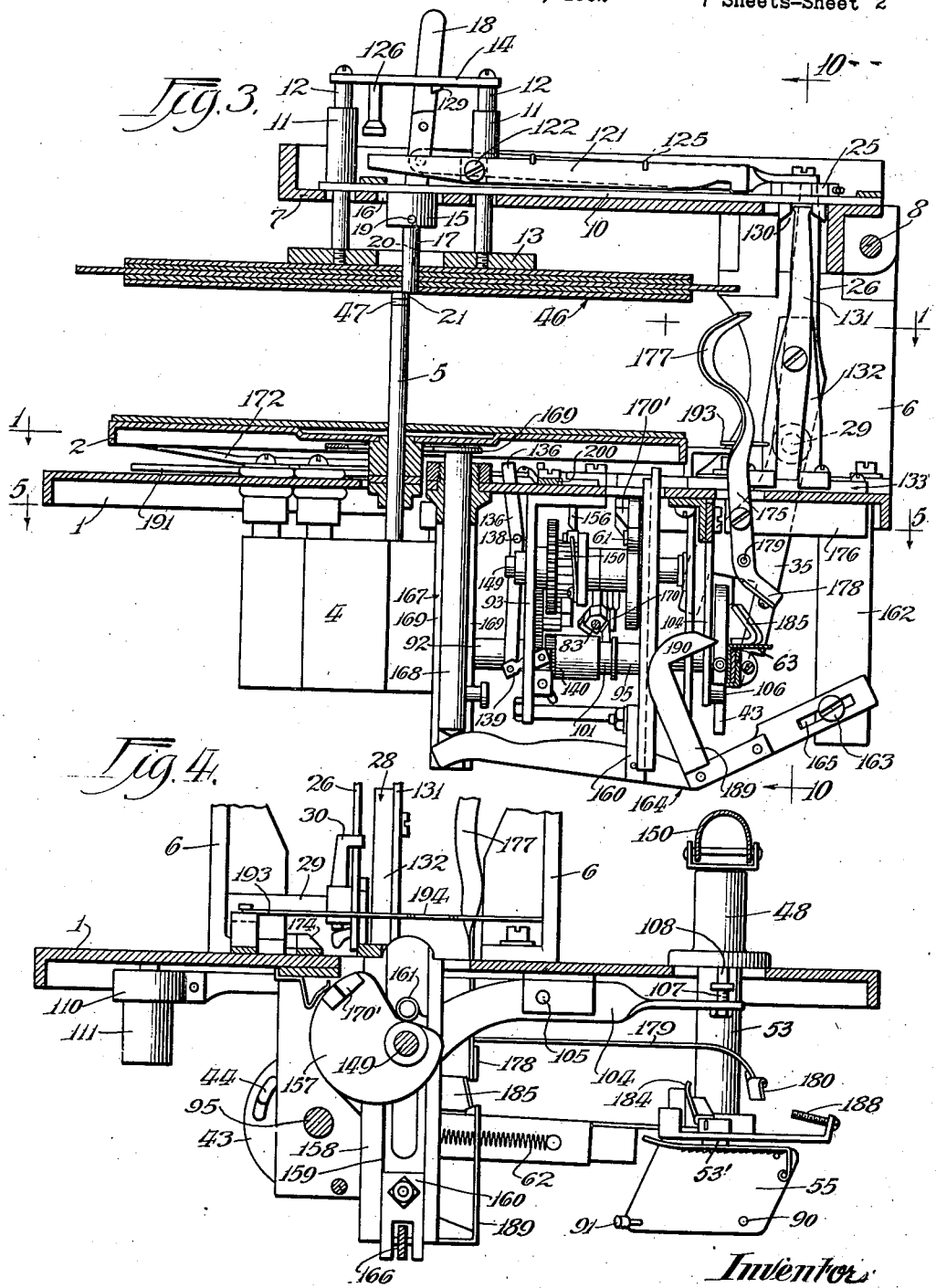
Inventor
Benjamin L. Gates
By Frank L. Belknap
Attorney Oct. 22, 1935. B. L. GATES 2,017,898
METHOD AND MEANS FOR AUTOMATICALLY CHANGING PHONOGRAPH RECORDS
Filed June 25, 1932 7 Sheets-Sheet 3
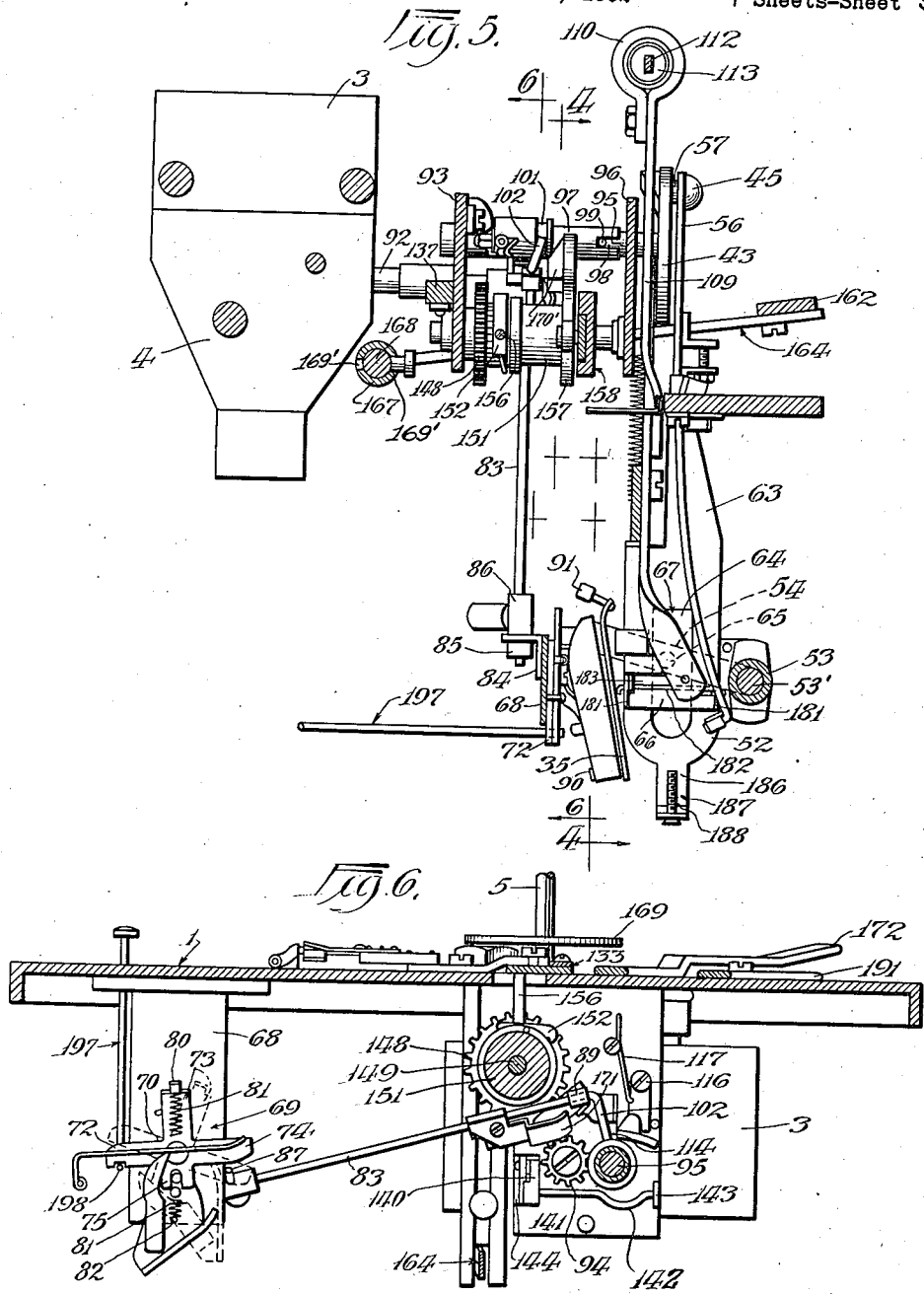
Inventor:
Benjamin L. Gates,
By Frank L. Belknap
Attorney.

Oct. 22, 1935.   B. L. GATES   2,017,898
METHOD AND MEANS FOR AUTOMATICALLY CHANGING PHONOGRAPH RECORDS
Filed June 25, 1932   7 Sheets-Sheet 4
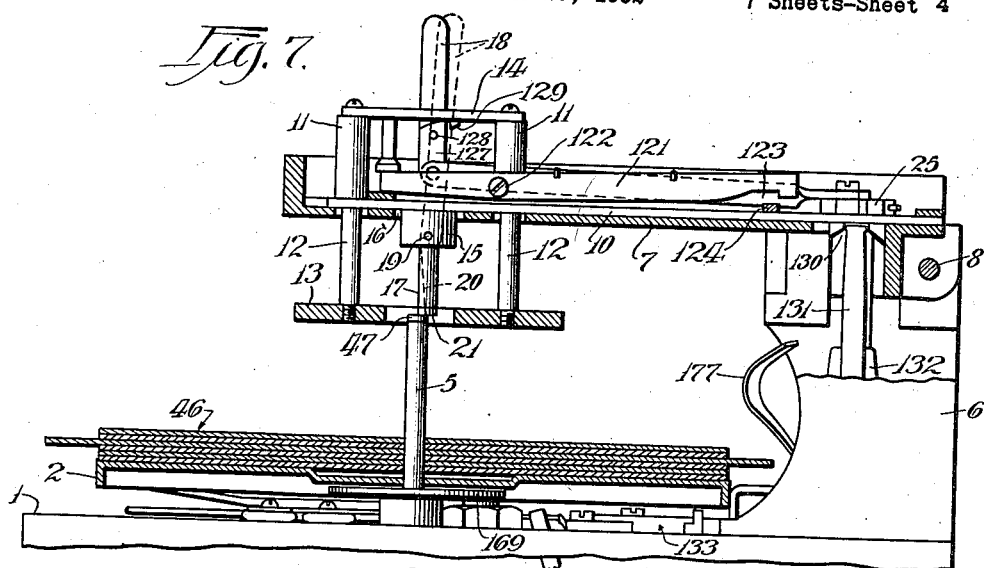
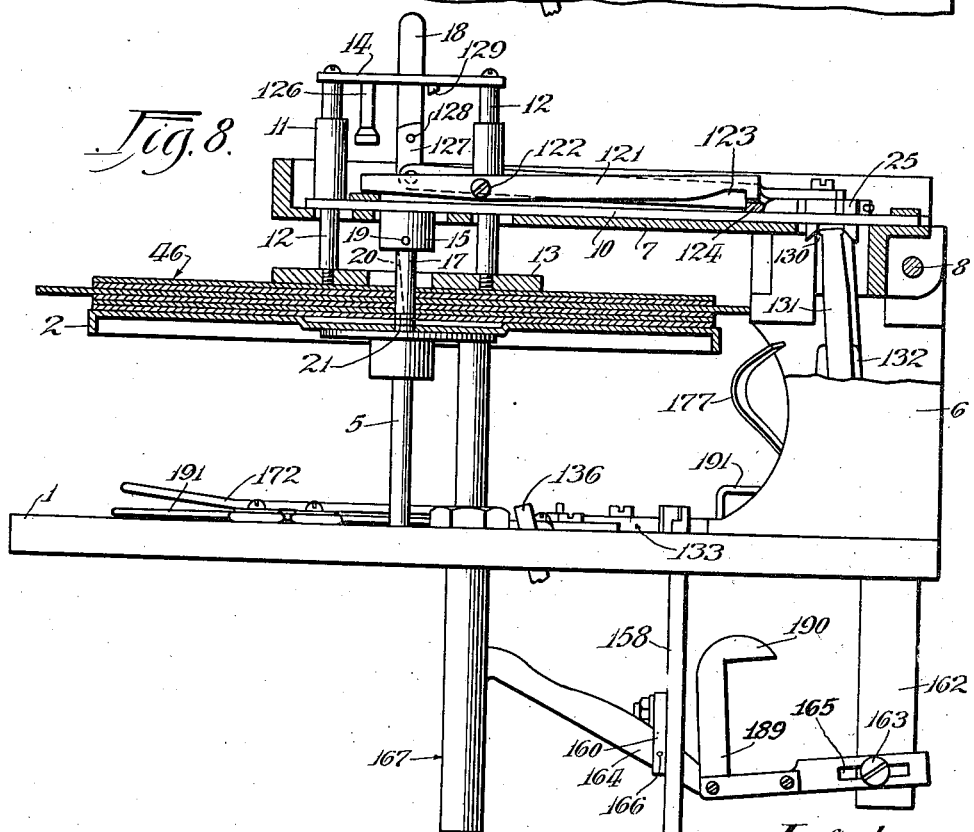

Oct. 22, 1935.                B. L. GATES                    2,017,898
           METHOD AND MEANS FOR AUTOMATICALLY CHANGING PHONOGRAPH RECORDS
                    Filed June 25, 1932            7 Sheets-Sheet 5
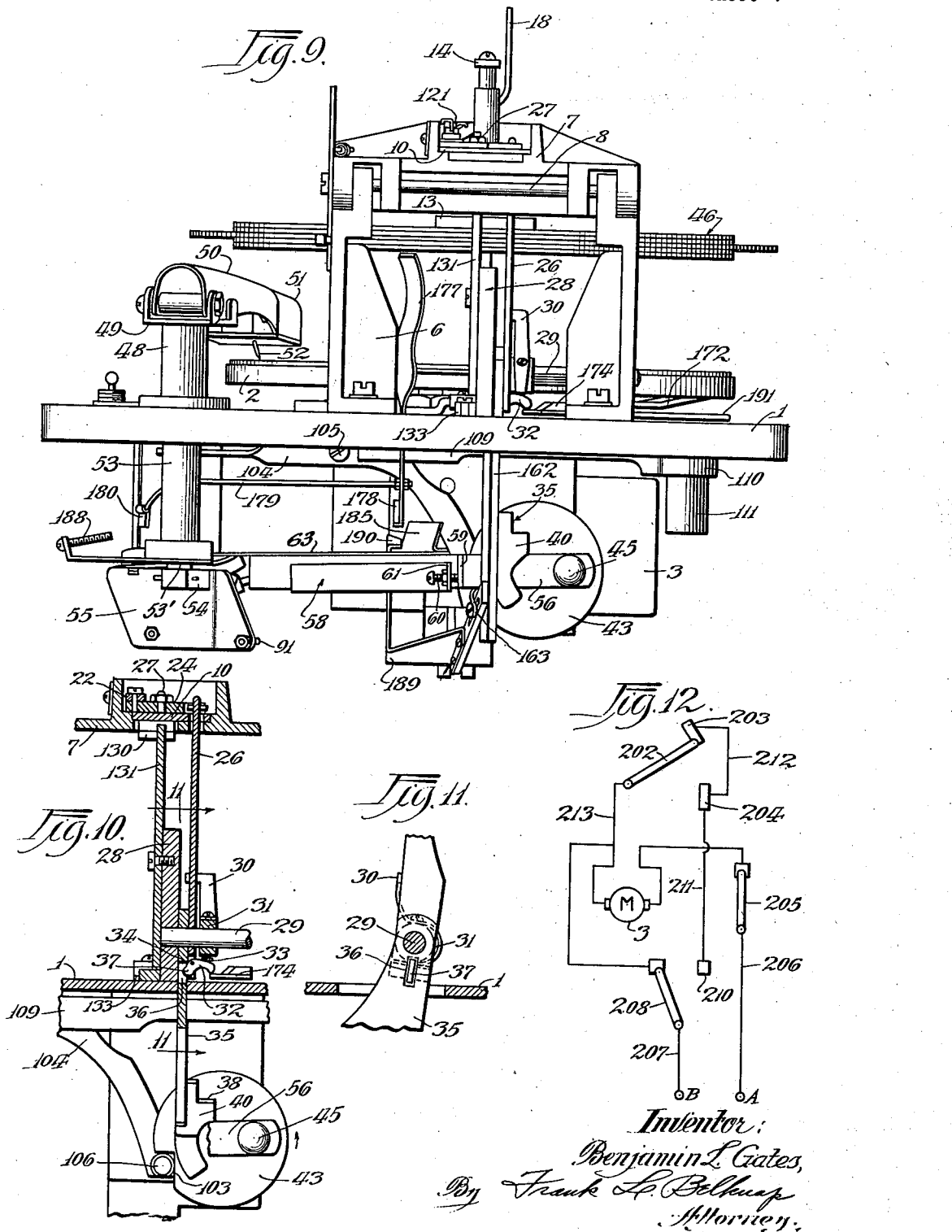

Oct. 22, 1935.  B. L. GATES  2,017,898
METHOD AND MEANS FOR AUTOMATICALLY CHANGING PHONOGRAPH RECORDS
Filed June 25, 1932  7 Sheets—Sheet 6
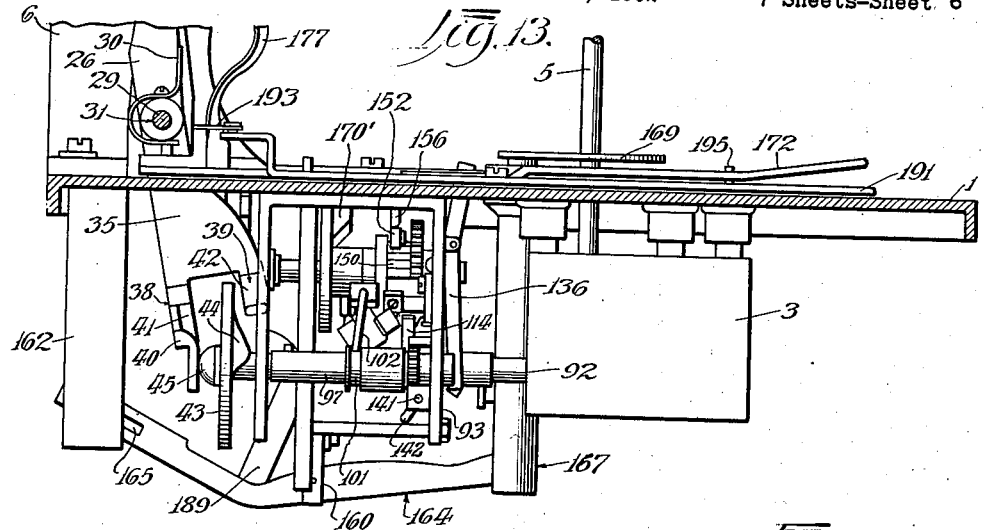
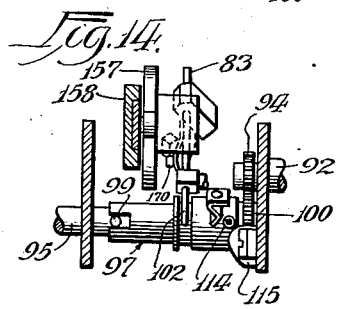
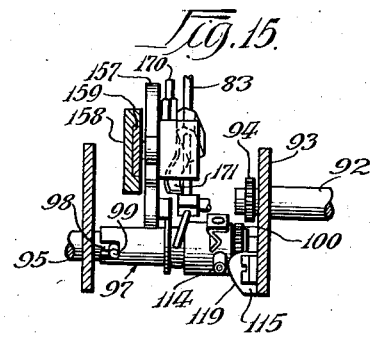
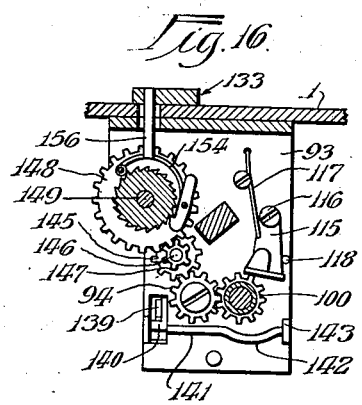
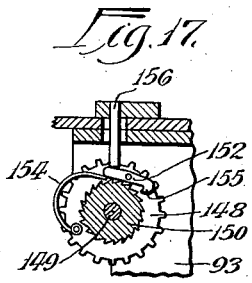
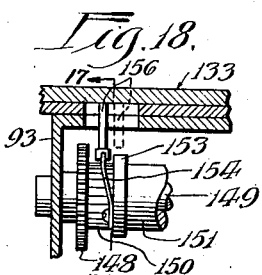
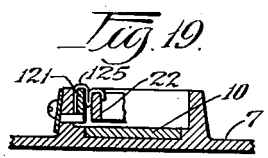
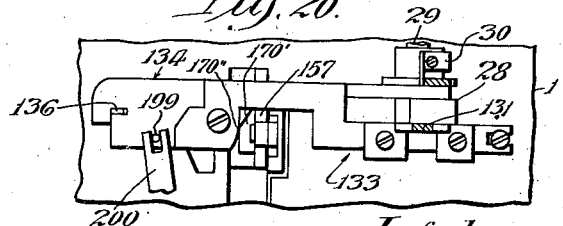

Oct. 22, 1935.  B. L. GATES  2,017,898
METHOD AND MEANS FOR AUTOMATICALLY CHANGING PHONOGRAPH RECORDS
Filed June 25, 1932   7 Sheets-Sheet 7
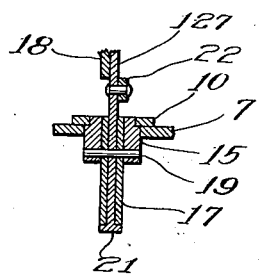
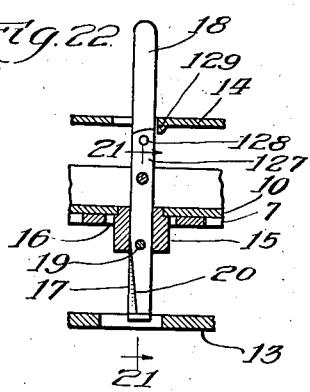
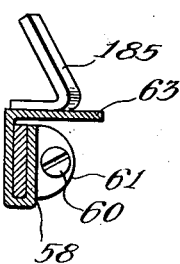
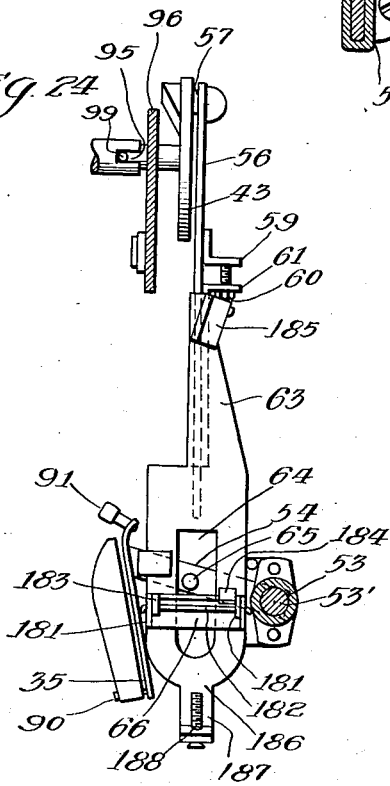
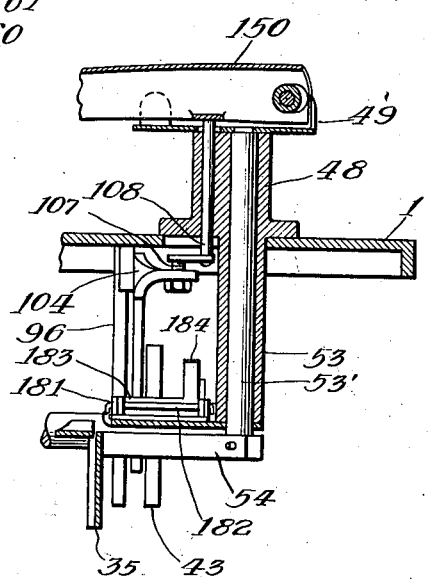
Inventor:
Benjamin L. Gates,
By Frank L. Belknap
Attorney Patented Oct. 22, 1935

2,017,898

UNITED STATES PATENT OFFICE 2,017,898

METHOD AND MEANS FOR AUTOMATICALLY CHANGING PHONOGRAPH RECORDS

Benjamin L. Gates, Chicago, Ill., assignor of one-half to Henry G. Saal, McHenry, Ill.

Application June 25, 1932, Serial No. 619,216

9 Claims. (Cl. 274—10)

This invention relates to improvements in a method and means for automatically changing phonograph records and refers particularly to a method and means for reproducing a plurality or records of all standard sizes in sequence; returning the records to a magazine after reproduction; repeating the reproduction of a desired record; interrupting the reproduction of a record intermediate its period of reproduction; and reproducing a predetermined record in the magazine without reproducing the preceding records therein.

Other objects and advantages of my invention will be apparent from the accompanying drawings and following detail description.

In the drawings, Fig. 1 is a sectional view taken on the line 1—1 of Fig. 3 and illustrates the upper portion of my machine with the turntable and magazine removed.

Fig. 2 is a top plan view of the magazine operating elements.

Fig. 3 is a sectional view taken on the line 3—3 of Fig. 1.

Fig. 4 is a sectional view taken on the line 4—4 of Fig. 1.

Fig. 5 is a sectional view taken on the line 5—5 of Fig. 3

Fig. 6 is a sectional view taken on the line 6—6 of Fig. 5.

Fig. 7 is a fragmentary side elevational view of my device illustrating all of the records positioned upon the turntable previous to the return of said records to the magazine.

Fig. 8 is a similar view illustrating the next sequential operation of the device wherein the records are returned to the magazine.

Fig. 9 is a rear elevational view of the device.

Fig. 10 is a sectional view taken on the line 10—10 of Fig. 3.

Fig. 11 is a detail sectional view taken on the line 11—11 of Fig. 10.

Fig. 12 is a schematic wiring diagram illustrating the electrical connections to the drive motor.

Fig. 13 is an elevational view taken from the opposite side of the device to that shown in Fig. 3.

Fig. 14 is a fragmentary detail view illustrating particularly the record changing, slidable gear in operative position.

Fig. 15 is a similar view illustrating the slidable gear in inoperative position.

Fig. 16 is a fragmentary detail view illustrating the record returning mechanism in operative position.

Fig. 17 is a similar view illustrating said mechanism in inoperative position.

Fig. 18 is a view similar to that shown in Fig. 17 taken at right angles thereto.

Fig. 19 is a sectional view taken on the line 19—19 of Fig. 2.

Fig. 20 is a fragmentary top plane detail view of mechanism associated with the record changing and record returning system.

Fig. 21 is a sectional view taken through the magazine pin on line 21—21 of Fig. 22.

Fig. 22 is an elevational view of the magazine pin illustrating the button shifting lever.

Fig. 23 is a transverse sectional view through the tone arm connecting rod levers.

Fig. 24 is a detail top plan view of the tone arm swinging mechanism.

Fig. 25 is an end view partly in section illustrating a portion of the tone arm lifting mechanism.

Referring particularly to the drawings, 1 indicates a support or platform upon the upper portion of which a turntable 2 is adapted to be positioned. A motor 3 may be mounted beneath the support 1 and may be coupled with a speed reducing mechanism 4 which may be of conventional construction. A shaft 5 may project upwardly from the mechanism 4 and is adapted to carry the turntable 2 which may be slidably mounted upon said shaft.

Supports 6 may extend upwardly from the upper surface of the platform 1 and may be adapted to carry beam 7 which may be hingedly mounted upon the upper end of the supports 6 as shown best at 8 in Fig. 3. The beam 7 may be provided with a channel or depressed portion 9 and a plate 10 may be slidably positioned therein. Two upwardly extending sleeves 11 may be formed integral with the plate 10 and may be adapted to guide rods 12 which may pass through said sleeves. Rods 12 may be connected together at their lower ends by means of plate 13 whereas the upper ends of said rods may be joined by means of bar 14. A collar 15 may be mounted upon the lower face of the plate 10 and may extend downwardly from said plate through aperture 16 provided in the beam 7. A pin 17 provided with a longitudinal slot, not shown, may be rigidly mounted upon the collar 15. A lever 18 may extend downwardly through the collar 15 and may be pivoted at 19 in said collar, the lower end of said lever terminating in rod 20 carrying at its lower end the button 21, said rod being adapted to move in the longitudinal slot in the pin 17.

The operation of this mechanism is such that when the lever 18 is positioned truly vertical, the button 21 terminating beneath the pin 17 forms a continuation of the cylindrical contour of said pin whereas when lever 18 is canted clockwise, the periphery of the button 21 is offset from the surface of the pin 17 and is disposed in coaxial relationship with respect to shaft 5.

A lever 22 may be pivotally connected at 23 to an intermediate portion of the lever 18, the arrangement being such that upon longitudinal movement of the lever 22 taking place, the member 18 will be canted. The opposite end of the lever 22 may be pivotally connected to arm 24 which forms a termination of the bifurcated members 25 positioned upon each side of the upper end of lever 26. The member comprising the arms 25 and termination 24 may be pivotally mounted upon plate 10 as shown best at 27 in Fig. 2. It can readily be seen that when the upper end of lever 26 moves backwardly or forwardly, said motion may be transmitted to the lever 22 which, in turn, imparts a canting movement to the lever 18 and either positions the button 21 in concentric position with respect to the pin 17 or offsets said button with respect to said pin.

A support 28 may be positioned between the members 6 as shown best in Figs. 9 and 10, and a shaft 29 may be mounted at one end upon support 28 and at the other upon one of the members 6. The lower end of the lever 26 may be rotatably mounted upon the shaft 29 and may be normally impelled forwardly, as viewed in Figures 9 and 10, by means of spring 30 mounted upon collar 31 which, in turn, may be rigidly positioned upon shaft 29. A key 32 may be pivotally connected to the lower end of the lever 26 and is normally impelled by means of spring 33 in a clockwise direction with respect to the pivot point 34. A lever 35 passes upwardly through the platform 1 and is rotatably mounted at its upper end upon the shaft 29. An intermediate portion of the lever 35 may be provided with a slot 36 into which a finger 37 of the key 32 is adapted to be positioned under the influence of the srping 33. The arrangement is such that normally the key 32 connects the levers 26 and 35 as a unitary structure. However, as will be hereinafter more fully described under certain conditions it is found desirable to operate each of said levers independently, this mechanism being of importance when it is desired to repeat the reproduction of a record which is presently playing.

The lever 35 may terminate at its lower end in arms 38 and 39, the arm 38 carrying follower 40 having inclined surface 41 whereas the arm 39 carries follower 42. The arms 38 and 39 may be disposed upon each side of cam 43, said cam being provided with an upraised portion 44 upon the side thereof adjacent the arm 39 and bolt head 45 upon the side of the cam adjacent the arm 38. The arrangement is such as the cam 43 rotates, the upraised portion 44 of said cam contacts the follower 42 and rocks the lever 35 in one direction, whereas the bolt head 45 following in circular travel the upraised portion 44 immediately thereafter, contacts the follower 40 and rocks the lever 35 in the opposite direction. In normal operation the lever 35 and lever 26 are locked together by means of the key 32 and, consequently, the rocking motion imparted by the cam 43 to the lever 35 will be transmitted to the lever 26 thence to the lever 22 and to the member 20.

In loading the magazine, the beam 7 may be swung about the hinges 8 and a plurality of records 46 may be threaded upon the pin 17, during the threading operation the button 21 being held in concentric position with respect to the axis of the pin 17. When the records are placed upon the pin 17 the rods 12 being loosely positioned within the sleeves 11 are raised, the plate 13 resting upon the uppermost record of the stack. The beam may then be lowered to horizontal position and the records 46 may be maintained upon the pin 17 inasmuch as the shaft 5 is disposed eccentric with respect to the pin 17 and, hence, is eccentrically disposed with respect to the apertures in the records. To release a record from the stack 46, the lever 18 may be so canted as to bring the axis of the button 21 into coincidence with the axis of the shaft 5 and the thickness of the button 21 is such as to permit but one record, the lowermost record, to be carried to a position wherein the axis of its aperture is coincident with the axis of the shaft 5. In this position the lowermost record falls downwardly to the turntable 2 whereas the remaining records are maintained upon the pin 17 due to the eccentric position of the button 21 with respect to said pin.

The record may be dropped to the turntable while the motor and hence the shaft 5 is in operation. In order to eliminate friction a rotatable tip 47 may be positioned upon the upper end of the shaft 5 and, consequently, when the records 46 rest upon the shaft 5, no relative motion will exist between the records supported by the tip 47 and the tip itself, the relative motion taking place between the tip and the upper portion of the shaft 5.

A collar 48 may be mounted upon the upper surface of the platform 1 and is adapted to support the plate 49 hingedly connected to which is the tone arm 50 which may carry at its end a pick up or reproducer 51 provided with needle 52. A hollow member 53 may be mounted upon the lower face of the platform 1 and may be disposed coaxially with respect to the collar 48 and a rod 53' may pass upwardly through the member 53 and the collar 48 and may be rigidly attached at its upper end to the plate 49.

The lower end of the rod 53' may carry arm 54 upon which may be mounted plate 55. An arm 56 may be pivotally mounted at one end upon the bolt 45 and the opposite end thereof may be slidably positioned within the sleeve 58. A lug 59 may be mounted upon one face of the arm 56 and is adapted to serve as a stop for the screw 60 threadedly mounted in lug 61 positioned at one end of the sleeve 58. The end of the screw 60 is normally maintained in contact with the surface of the lug 59 by means of coil spring 62 which is anchored at one end upon the sleeve 58 and at the other end upon the arm 56.

The sleeve 58 is disposed around both sides of the arm 56 and extends over the top of said arm in the form of a plate 63. At the end of the plate 63 an aperture 64 may be provided and pin 65 mounted upon the arm 54 is adapted to extend upwardly through said aperture. A bar 66 may be mounted upon the upper face of the member 63 and forms the outer defining edge of the aperture 64 and, as will be hereinafter more fully described, when reproducing records of the larger size, namely 12 inch records, said bar 66 is adapted to contact the pin 65 to move the arm 54 which, in turn, rotates rod 53 and swings the tone arm 50 to and from operative position upon the record.

In normal playing position, that is, when the tone arm is so disposed as to position the needle 52 upon the outer convolutions of the phonograph record, the pin 65 is positioned in contact with the bar 66 which spans the aperture 64 and the arm 56 is at its outermost dead center position upon the cam 43. As the record is being reproduced and the needle 52 follows the convolutions upon the record, the tone arm is carried toward the center of said record and consequently the pin 65 is carried away from the bar 66. When the needle 52 reaches its centermost position upon the record, by means which will be hereinafter more fully described, the tone arm 50 carrying the pick up 51 is raised and simultaneously cam 43 is caused to rotate thereby moving arm 56 and, hence, sleeve 58 in such a manner as to cause the defining edge 67 of the aperture 64 to contact the pin 65 carried by the arm 54. As the rotation of the cam 43 continues, arm 54 is swung in such a manner as to swing the tone arm 50 outwardly from the outer periphery of the turntable, in other words, said tone arm is moved to inoperative position.

A plate 68 may be mounted upon the lower surface of the platform 1 and may extend downwardly therefrom, said plate being adapted to carry a "butterfly mechanism" 69. The butterfly 69 may comprise member 70 which may be pivotally mounted upon the face of the plate 68 at 71. The member 70 may comprise arms 72, 73 and 74 and may be provided with a bifurcated extension 75. The cooperating part of the butterfly may comprise plate 76 pivotally mounted upon the plate 68 at 77, said plate 76 carrying pin 78 which may be positioned between the arms of the bifurcated portion 75. The lower edge of the plate 76 may be inclined to the horizontal and may be provided with flange 79 formed at right angles to the face of the plate 76. A lug 80 may be provided at the end of the arm 73 and is adapted to serve as an anchorage for one end of coil spring 81, the opposite end of said spring being anchored at 82 upon the plate 76.

The arrangement is such that normally the mechanism occupies the position shown in full lines in Fig. 6. As will be hereinafter more fully described, a force applied to the upper surface of the flange 79 will rotate the plate 76 about the pivot point 77. By so rotating plate 76 the member 70 also rotates in the opposite direction about the pivot point 71 until the anchorages 80 and 82 pass outside the line formed by said anchorages and the pivot points 71 and 77, in other words, as soon as the mechanism is removed from dead center position, at which period the spring 81 operates to further rotate the members 70 and 76.

A shaft 83 may be rotatably mounted at one end in the lug 84 which, in turn, may be positioned upon the plate 68. Longitudinal motion of said shaft may be prevented by means of the collars 85 and 86 and a pin 87 may project from the face of the collar 86. Said pin, when the butterfly mechanism is in normal position is disposed immediately below the arm 74 and, consequently, when said mechanism is sprung, arm 74 descends in a clockwise direction and contacts pin 87 and thereby rotates or rocks shaft 83, the shaft being journalled at its end in the bearing 89.

The plate 55 carries upon the end of the arm 54 may be provided with pins 90 and 91 which extend outwardly from the surface of the plate.

As has been hereinbefore described, the arm 54 and consequently the plate 55, upon movement of the shaft 53, describe arcs proportional to the arc described by the tone arm 50. When the tone arm is disposed in initial playing position, that is, when the needle initially engages the outer convolutions upon the record, the butterfly mechanism is set in its normal position. As the tone arm 50 swings inwardly toward the center of the record during reproduction of the record, the pin 90 carried upon the plate 55 moves in a path adjacent the upper surface of the flange 79. When the tone arm 50 reaches its final playing position upon the record, the pin 90 will have moved into contact with the upper surface of the flange 70 and will rotate the member 76 in a counterclockwise direction a sufficient degree to remove the butterfly from its dead center position. As has been hereinbefore described, the remaining motions of the elements 70 and 76 are accomplished by the spring 81 and, hence, it can readily be seen that the tone arm 50 in positioning itself at its final playing position upon the record, springs the butterfly which results in the rocking of the shaft 83 about its longitudinal axis.

A shaft 92 may extend outwardly from the gear reducing mechanism and may be journalled at its outer end in plate 93 which may be mounted upon the lower face of the platform 1 and may extend downwardly therefrom. The shaft 92 may carry gear 94 upon the opposite side of the plate 93. A shaft 95 may be journalled at its ends in the plate 93 and plate 96 which latter is also mounted upon the lower surface of the platform 1. A sleeve 97 may be slidably positioned upon the shaft 95 and may be provided with slots 98 at one extremity thereof. Pins 99 may be positioned upon the surface of shaft 95 and are adapted to extend into the slots 98. By this construction it can readily be seen that the sleeve 97 will be relatively slidable with respect to shaft 95 but will rotate as a unit with said shaft. The opposite end of the sleeve 97 may carry spur gear 100 which, as will be hereinafter more fully described, is adapted to be mashed with the spur gear 94. The sleeve 97 may be provided intermediate its length with an annular groove 101 into which the bent end 102 of shaft 83 is adapted to extend.

When the tone arm 50 swings toward the center of the record as the record is being reproduced, as has been hereinbefore described, pin 90 carried by plate 55 swings adjacent the upper surface of flange 79 upon plate 76. When the tone arm 50 reaches its final playing position at the central portion of the record, pin 90 will have contacted flange 79 so as to spring the butterfly mechanism 69 which, in turn, rotates the shaft 83. Upon rotation of said shaft, the bent end 102 thereof slides the sleeve 97 longitudinally along the shaft 95 and engages gear 100 with gear 94. The cam 43 is also mounted upon the shaft 95 and consequently when said engagement takes place, shaft 95 is caused to rotate thereby rotating cam 43.

Cam 43 may be provided with an indentation 103 at one portion of its peripheral surface. A lever 104 may be pivotally mounted adjacent the lower surface of the platform 1 as shown best at 105 in Fig. 9. One end of the lever 104 extends downwardly and carries follower 106 which is adapted to ride upon the surface of the cam 43. The opposite end of said lever may be provided with an adjustable screw 107 which may contact pin 108 which, in turn, extends upwardly through the sleeve 48 and is adapted to contact the lower face of the tone arm 50.

While a record is being reproduced, which may be considered the normal position of the mechanism constituting my machine, the follower 106 carried by the lever 104 may be disposed within the indentation 103 of cam 43 and said cam may be stationary, that is, gears 94 and 100 may be disengaged. When the butterfly mechanism 69 acts to rotate shaft 83 and engage gears 100 and 94, the cam 43 rotates and consequently lever 104 is rotated clockwise thereby exerting an upward thrust upon pin 108 and raising the tone arm 50 so that the needle carried by the pick-up 51 is removed from the upper surface of the record. Simultaneously with the raising of the tone arm, cam 43 acts through lever 56 and the associated mechanism hereinbefore described, to swing lever 54, rotating shaft 53 and swinging tone arm 50 outwardly from the center of the record. In this manner the tone arm 50 is automatically removed from its position over the turntable 2.

During rotation of the cam 43 the contact member 44 upon the rear face of said cam comes into contact with arm 39 of lever 35 and said lever is rocked about the shaft 29, thereby imparting longitudinal movement to the link 22 which, in turn, cants lever 18 and brings button 21 into registration with the pin 17. As has been hereinbefore described in thus positioning button 21 in coincidence with pin 17, the lowermost record of the stack of records 46 threads itself upon button 21, the entire stack of records being supported by the upper end of the shaft 5.

A relatively short interval after contact of the member 44 with arm 39, the upraised member 45 upon the front face of the cam 43 contacts the inclined surface 41 of follower 40 and rocks arm 35 in an opposite direction, thereby bringing button 21 to a concentric position with respect to shaft 5 thereby carrying lowermost record therewith and threading the same on shaft 5 and hence depositing said record upon the turntable.

When the record has been deposited upon the turntable 2 in the manner hereinbefore described and cam 43 continues its rotation, the tone arm is moved by means of the shaft 56 and the associate mechanism 66 which contacts pin 65 to a position immediately above the initial convolutions upon the record. Previous to this operation, however, pin 91 carried by plate 55 in swinging counterclockwise during the removal of the tone arm 50 from its position over the record, contacts plate 76 and resets the butterfly mechanism 69, that is, positions said mechanism as shown in full lines in Fig. 6. When the cam 43 has made one complete revolution, the follower 106 carried by lever 104 drops into the indentation 103 upon the cam 43 and, hence, tone arm 50 is lowered until the needle carried by pick up 51 engages the initial convolutions upon the record.

An arm 109 may be rigidly connected to lever 104 and may terminate in clamp 110 which is adapted to circumscribe cylinder 111. A lug 112 may be mounted upon the lower surface of the platform 1 and may carry at its lowermost end piston 113 which is adapted to be positioned within cylinder 111. The cylinder 111 is closed at its lower end and consequently when follower 106 carried by lever 104 drops into the indentation 103 of cam 43 thus permitting the tone arm 50 to descend, said descent is damped by the dash pot action of the piston 113 within the cylinder 111.

Consequently, the needle carried by the pick up 51 descends gently to the surface of the record.

When the tone arm assumes its position over the initial convolutions upon the record and has dropped thereto, cam 43 will be positioned as shown best in Fig. 9. A pin 114 is mounted upon the surface of the sleeve 97 adjacent gear 100. A lug 115 may be pivotally mounted at 116 upon the plate 93, said lug being normally impelled in a counterclockwise direction about said pivot point by means of leaf spring 117. However, said counterclockwise motion is limited by pin 118 positioned upon the surface of plate 103. The lug 115 is provided with an inclined edge 119 which is disposed adjacent the path of travel of pin 114 when gear 100 is in mesh with gear 94. The arrangement is such that upon completion of one revolution of cam 43, pin 114 contacts the inclined surface 119 of lug 115 and rocks said lug against the impelling force of spring 117. However, when the maximum impulse of said spring has been reached, the sleeve 97 slides longitudinally along shaft 95 thereby disengaging gears 100 and 94 and bringing cam 43 to a stationary position. Simultaneously with the sliding of the sleeve 97 upon the shaft 95, shaft 83 is rocked and pin 87, carried upon said shaft is positioned adjacent the lower surface of the arm 74 whereby the mechanism is set to engage gears 100 and 94 when the tone arm so positions itself as to spring the butterfly mechanism 69.

Referring particularly to Figs. 2, 7 and 8, a lug 120 may be mounted upon the upper surface of the plate 10 and a lever 121 may be pivotally mounted upon said lug at 122. One end of the lever 121 may be provided with a notch 123 which is adapted to engage with lug 124 mounted upon the body of the platform 7. A spring 125 mounted upon lever 22 may have one end positioned over the top of the lever 121 and may normally impel that end of the lever downwardly so as to secure engagement between the lug 124 and the slot 123. The opposite end of the lever 121 may be positioned immediately beneath pin 126 carried by the cross member 14. A plate 127 may be rigidly connected to the lever 18 as shown best at 128 in Figs. 7 and 8, and a lug 129 may be mounted upon the lower surface of the cross member 14 adjacent the upper portion of the plate 127.

When the last record has been removed from the magazine, the plate 13, pins 12 and cross member 14 will have descended to the position shown in Fig. 7 and the pin 126 will have contacted the end of the lever 121, thereby raising the opposite end thereof and disengaging lug 124 from the notch 123. In addition lug 129 positions itself immediately adjacent the upper portion of plate 127 and thereby prevents relative motion of the lever 18 and the cross member 14. Inasmuch as the cross member 14 is immovable with respect to lateral motion of the slidable plate 10, any force exerted by lever 22 will not rock lever 18 but will tend to move the entire lever assembly in a lateral direction. At this period this motion may be accomplished since the anchoring lug 124 is disengaged from the slot or notch 123. Consequently, when cam 43 rotates in such a manner as to contact the inclined surface 41 of the arm 38, lateral motion is imparted to the plate 10 and, consequently, the entire mechanism mounted upon said plate and the pin 17 including button 21, is brought into coincidence with the turntable shaft 5.

The plate 10 is operatively connected at 130 to the upper end of lever 131 pivotally mounted upon the support 132 which, in turn, may be positioned upon the upper surface of the platform 1. The lower end of lever 131 is connected to the slidable assembly 133 shown best in Fig. 1. The assembly 133 may carry at one end member 134 provided with slot 135 into which the upper end of lever 136 may be positioned. Consequently, when plate 10 is moved by lever 35, said motion is transmitted by means of lever 131 to the slidable member 133, and consequently, the rocking motion is imparted to lever 136.

Lever 136 may be pivotally connected intermediate its length to lug 137 mounted upon the surface of plate 93 as shown best at 138 in Fig. 3. The opposite end of lever 136 may be pivotally connected to link 139 which, in turn may be pivotally connected to arm 140. Rod 141 having a bent portion 142 may be rotatably mounted in the bearings 143 and 144 and arm 140 may be rigidly mounted upon said rod. Hence, lateral motion of the slidable assembly 133 rocks lever 136 which motion is transmitted through the various linkages hereinbefore described to rod 141, said rod being rotated in such a manner as to dispose the plane of the bent portion 142 either parallel to or at right angles to the plane of the plate 93.

When lever 35, being actuated by cam 43, positions pin 17 and turntable shaft 5 in a coaxial relation, lever 131 will shift the slidable assembly 133 in such a manner as to rotate rod 141 and position the plane of the bent portion 142 of said rod at right angles to the face of the plate 93. At this period the gear 100 is in mesh with the gear 94 inasmuch as cam 43 rotates. However, when the pin 114 carried upon the surface of the sleeve 97 rotates substantially 90 degrees from its normal position, said pin contacts the inclined surface of the bent portion 142 and is forced outwardly thereby disengaging gears 94 and 100 and stopping the rotation of cam 43.

Gear 94 mounted upon shaft 92 normally meshes with gear 145 mounted upon shaft 146 which, in turn, is positioned upon the plate 93. Gear 147 is also mounted upon shaft 146 and turns as a unit with gear 145. Gear 147 is adapted to mesh with gear 148 which is loosely mounted upon shaft 149. A ratchet 150 is also loosely mounted upon shaft 149 and turns as a unit with gear 148. A collar 151 is also loosely mounted upon shaft 149 and carries pawl 152 which may be pivotally mounted upon the annular flange 153 of sleeve 151. A spring 154 may be anchored at one end upon the flange 153, the opposite end of said spring bearing upon the end of pawl 152 and normally impelling the contacting end 155 thereof radially toward the ratchet wheel 150. It can readily be seen that the construction is such that normally the gear 148 and ratchet 150 revolve when the motor 3 is in operation. However, until the pawl 152 operatively contacts the ratchet wheel, the sleeve 151 will remain stationary.

A pin 156 is mounted upon the lower surface of the slidable assembly 133 and extends downwardly therefrom. In normal operation that is, when a record is being reproduced upon the turntable and also during the period when a record is being transferred from the magazine to the turntable, the pin 156 engages the end of the pawl 152 and depresses the same against the impelling force of spring 154 thereby disengaging the pawl 152 from the ratchet wheel 150.

However, during the period that the reproduced records upon the turntable are returned to the magazine, the platform 10 has been shifted to bring the pin 17 into coaxial relationship with the turntable shaft 5 and, consequently, lever 131 has been rocked thereby slidably displacing the mechanism 133. This, in turn, removes the pin 156 from its position upon the end of pawl 152 and permits the operative point 155 of the pawl to engage the ratchet 150.

As has been hereinbefore described, gear 148 and ratchet wheel 150 are normally rotating, consequently, when pawl 152 engages ratchet wheel 150 the collar 151 turns with the ratchet wheel 150 and gear 148 as a unit.

A cam 157 is also loosely mounted upon the shaft 149 and is adapted to turn with the collar 151 as a unit. A guide plate 158 may be mounted upon the lower surface of the platform 1 and is provided with a groove 159 in which the follower 160 is adapted to slide. The upper end of follower 160 carries roller 161 which is adapted to be carried by the peripheral surface of the cam 157.

A bar 162 may be mounted upon the lower surface of the platform 1 and may depend downwardly therefrom, said bar carrying at its lower extremity a screw 163. A lever 164 provided with a slot 165 at one of its ends is slidably positioned over the screw 163. Intermediate the length of the lever the same is pivotally attached to the lower end of the follower 160 as shown best at 166 in Fig. 4.

A tubular sleeve 167 is mounted upon the lower surface of the platform 1 and extends downwardly from said platform. A rod 168 is slidably positioned within the sleeve 167, said rod at its upper end supporting platform 169 which is positioned immediately beneath the turntable 2. The platform 169 is annular in shape and normally, that is, during periods of reproduction and changing of records, said platform does not contact the turntable. The opposite end of lever 164 is positioned immediately beneath rod 168 and supports said rod.

The arrangement is such that when lever 35 is so actuated to bring pin 17 into coaxial relationship with turntable shaft 5, the slidable assembly 133 has so shifted as to permit pawl 152 to engage ratchet wheel 150 and thereby rotating the sleeve 151 and, hence, rotating cam 157. As the cam rotates, roller 161 following the surface of the cam is raised upwardly thereby drawing lever 164 upwardly. Slots 169' may be provided upon diametrically opposite surfaces of the tubular member 167, said slots being adapted to accommodate the end of the lever 164. As said lever travels upwardly, rod 168 is also projected upwardly carrying platform 169 and, hence, turntable 2. At this period, the reproduced records being carried by the turntable are transferred from shaft 5 to pin 17.

When all of the records have been transferred to the pin 17, lug 170' positioned upon the side of cam 157 contacts the edge 170'' of the slidable assembly 133 and shifts plate 10 so as to offset pin 17 from shaft 5. However, at this period pin 126 does not contact the end of lever 121 and, hence, slot or notch 123 re-engages lug 124 and relocks lever 121 and beam 7. Consequently, button 21 remains in concentric position with shaft 5 and one record, the lowermost record, remains upon the turntable 2.

At this period pin 170 carried by sleeve 151 is so positioned with respect to the cam 157 that pin 170 contacts arm 171 carried by shaft 83 thereby rotating said shaft, shifting collar 97 and re-engaging gears 100 and 94. In this manner the tone arm is brought to playing position upon the record which has descended with the turntable.

As cam 43 continues its rotation, pin 114 carried upon collar 97 contacts the inclined surface 119 of lug 115 and gear 100 is thereby disengaged from gear 94. However, as has been hereinbefore described, this action does not take place until cam 43 has so rotated as to bring tone arm 50 into initial playing position and roller 106 in the indentation 103.

If it is desired to reproduce a record upon the turntable which has just completed reproduction, the levers 26 and 35 may be disconnected by disengaging key 32 from slot 36. To accomplish this a lever 172 may be pivotally mounted upon the upper surface of the platform 1 as shown at 173 in Fig. 1. One end of said lever may be provided with lug 174 which, when said lever is rocked, is inserted beneath the end of key 32 thereby raising the opposite end thereof out of slot 36. Hence, when cam 43 rotates, tone arm 50 will be removed from the center of the record to its inoperative position outside the periphery of the turntable. Lever 35 will be actuated by the projections 44 and 45 but said motion will not be transmitted to lever 26, hence, a record will not be released from the magazine. When cam 43 has completed 180 degrees of its rotation, tone arm 50 returns to its initial playing position over the record and the needle carried by pick up 51 is dropped to the initial convolutions upon the record. In this manner the reproduction of any desired record upon the turntable may be repeated as long as levers 26 and 35 are mechanically disconnected.

It can readily be seen that when cam 157 has completed one rotation, pin 17 may be brought to a position eccentric with turntable shaft 5. The motion which has brought about this eccentricity also shifts the slidable assembly 133 which, in turn, positions pin 156 over the path of travel of pawl 152 and, consequently, said pawl is raised from contact with the ratchet 150 thereby permitting gear 148 and ratchet 150 to idle upon shaft 149.

It is apparent that inasmuch as tone arm 50 is automatically positioned upon the initial configurations of the record upon the turntable, if records of different diameters are to be played upon my device, provision must be made for the different positioning of the tone arm 50 upon the initial convolutions of the record. Phonograph records at the present time are substantially standardized in two sizes namely, 10 inch records and 12 inch records. Assume for the sake of example that both sizes are indiscriminately contained within the stack 46.

To position automatically the tone arm properly upon the initial convolutions of a record regardless of whether it is a 10 inch or 12 inch record, I may provide a lever 175 which may be pivotally mounted upon the plate 176 positioned upon the lower surface of the platform 1. The upper end of said lever is formed as shown best at 177 in Fig. 3 with a portion of its surface adjacent the periphery of the record descending from the pin 17 to the turntable shaft 5. The lower end of said lever may carry lug 178 and may be connected to rod 179 which terminates in finger 180.

Bar 66 mounted adjacent the aperture 64 in plate 63 may be provided with upwardly turned flanged ends 181, said ends may serve as bearings for pin 182 which is adapted to carry member 183, said member being pivotally mounted with respect to the bar 66 and disposed parallel thereto. A finger 184 may be carried by the member 183, said finger being adapted to rotate member 183 about shaft or pin 182. When member 183 is disposed in a plane parallel to the bar 66, said member contacts pin 65 mounted upon arm 54 and consequently the motion of the plate 63 which carries the bar 66 is imparted to pin 65 by the contact of said pin with the member 183. If member 184 is so rotated as to be positioned at right angles to bar 66, the effective contact of the plate 63 with the pin 65 will be delayed a distance equal to the thickness or width of member 183, said width may be so calculated with the lever arms and tone arm 50 as to compensate for the difference in diameter of a 10 inch and 12 inch record.

In operation, when a 10 inch record is released from the magazine and falls to the turntable, said record will not contact the upper end 177 of lever 175 and, consequently, member 183 will remain disposed parallel to bar 66 and said member will contact pin 65 and will serve as the motivating element in moving tone arm 50 to its position over the initial convolutions of the 10 inch record. If a 12 inch record drops from the magazine to the turntable, the edge of said record will contact the end 177 of lever 175 and will rotate said lever in a clockwise direction. Hence, rod 179 will be moved to a position immediately above the path of travel of finger 184. As can readily be seen the record dropping from the magazine to the turntable drops when the tone arm 50 is at its outermost position with respect to the turntable. Consequently, contact with the lever 177 does not take place until pin 65 is in contact with edge 67 of the aperture 64. When cam 43 continues its rotation to bring tone arm 50 back to the initial playing position upon the record, finger 184 contacts finger 180 upon rod 179 and thereby rotates member 183 through an angle of 90 degrees and positions said member at right angles to the bar 66. Consequently the throw of the arm 54 is decreased by the amount of the width of the member 183 and by proper calculation of the various moment arms said width will correspond to the difference in throw of the tone arm for a 12 inch record. Hence, the tone arm will descend with respect to the turntable at a greater distance from the center of said turntable than would otherwise be the case if member 183 remained in its parallel relation with bar 66.

If the next record in the magazine happens to be a 10 inch record, of course provision must be made to both rock lever 175 in a counterclockwise direction to remove finger 180 from above the path of travel of finger 184, and to replace member 183 from its position at right angles to bar 66 to a position parallel and coplanar with respect to said bar. To accomplish this I may provide lug 185 upon plate 63, said lug being adapted to contact lug 178 carried at the lower end of lever 175 when cam 43 so moves as to swing tone arm 50 from contact with the record upon the turntable. In this manner lever 175 is rotated in a counterclockwise direction.

A plate 186 may be mounted upon the lower end of the sleeve 52 and may be provided with an extension 187 threadedly positioned in the end of which is an adjustable screw 188. When plate 63 moves to swing tone arm 50 to its inoperative position outside the periphery of the turntable, screw 188 contacts finger 184 carried by member 183 and rotates said finger in a counterclockwise direction thereby bringing the plane of member 183 into coincidence with the plane of the bar 66. Consequently, when cam 43 continues the remaining half of its rotation, pin 65 will be contacted by the edge of member 183 and the tone arm 50 will be swung to a position immediately above the initial convolutions of the 10 inch record.

When all of the records have dropped in sequence from the magazine to the turntable, and the turntable is raised by the cam 157, it can readily be seen that any 12 inch records which may have previously been played and are now contained in the pile upon the turntable, will contact the portion 177 of lever 175 and will rock said lever in a clockwise direction thereby positioning finger 180 immediately above the path of travel of finger 184. However, the lowermost record may be a 10 inch record whereas finger 180 is so positioned as to rock member 183 out of operative position, that is, the mechanism would be set for a 12 inch record. To compensate for this condition an arm 189 may be mounted intermediate the length of the lever 164 and may be provided with an extension 190 which, when arm 164 is raised to return the records upon the turntable to the magazine makes contact with lug 178 and rotates lever 175 in a counterclockwise direction thereby positioning finger 180 out of the path of travel of finger 184. Hence, when the lowermost record is to be reproduced, tone arm 50 will be automatically positioned upon the outer convolutions of said record which, in the illustrated case, is a 10 inch record.

If the lowermost record happened to be a 12 inch record, the lever 177 during the raising of the records upon the turntable would be rocked in a clockwise direction; extension 190 would then act to rock lever 175 in a clockwise direction. However, inasmuch as the lowermost record is in this case a 12 inch record, lever 175 would again be rocked in a clockwise direction thereby positioning finger 180 above the path of travel of finger 184 and tone arm 50 would be positioned over the initial convolutions of the 12 inch record.

A lever 191 may be pivotally mounted upon the upper surface of the platform 1 at 192. A rod 193 may be mounted upon the end of the lever 191 and may be provided intermediate its length with an offset portion 194. A pin 195 may extend upwardly from the upper surface of lever 191.

If a 12 inch record is being reproduced upon the turntable and it is desired to repeat the reproduction of said record, lever 191 may be rocked in a clockwise direction thereby affecting the contact of the offset 194 with the upper portion of lever 175, in this manner positioning finger 180 immediately above the path of travel of the finger 184. Simultaneously, lever 172 will be rocked about the pivot point 173 and the inclined lug 174 carried at the end of lever 172 will act to disconnect the levers 26 and 35. In this manner the record releasing mechanism will be disconnected from the remaining portion of the machine and the finger 180 will be so positioned as to rock member 183 to a right angled position with respect to the plane of the face of bar 66. Consequently, on the return travel of the cam 43, tone arm 50 will be positioned immediately above the initial convolution of the 12 inch record.

It frequently happens that a machine of this type will remain unplayed for relatively long periods of time. It also happens that the operator may not have an opportunity to remove the unplayed record from the magazine previous to rendering the machine inoperative. If the records 46 were to remain suspended in the magazine, that is, hanging upon the offset button 21, said records would warp if maintained in this position for a relatively long period of time. Consequently I have provided means whereby the machine, when being shut off, will continue to deposit the records from the magazine to the turntable without reproducing them until all of said records have been deposited upon the turntable, at which period the turntable will raise and thread the records upon the pin 17. However, the turntable instead of returning to its normal position will remain in its upraised position supporting the records within the magazine at which period the motor will be disconnected. By this means I provide adequate support for the records in the magazine and said machine may be rendered inoperative for an indefinite period without causing said records to warp.

To accomplish this purpose I may provide a switch handle 196 which, when in the position shown in full lines in Fig. 1, permits normal, continuous operation of the magazine whereas when shifted to the position shown in dotted lines, permits the operation above mentioned.

A rod 197 may be pivotally mounted intermediate its length upon the lower surface of the platform. One end of said rod, namely, end 198 is normally positioned beneath arm 72 of the butterfly mechanism 69. The opposite end of said rod may be depressed by the movement of the switch handle 196 when said handle is moved from its full line position to its dotted line position, and thereby the end 198 of the rod 197 will be elevated thereby springing the butterfly mechanism and causing the same to rotate rod 83 engaging gears 100 and 94. This operation immediately sets cam 43 into rotation whereby the tone arm 50 is raised and swung outwardly from the periphery of the turntable to its inoperative position. Upon reaching its outermost travel the pin 91 carried upon the plate 55 which, in turn, is carried upon the end of arm 54 tends to reset the butterfly mechanism. However, the rod 197 possesses sufficient resilience to permit the butterfly mechanism to be reset into the position shown in full lines in Fig. 6. However, immediately upon the return of the tone arm 50 toward the turntable, the resiliency of rod 197 asserts itself and springs the butterfly mechanism to again inter-mesh gears 100 and 94 which immediately causes the tone arm to again rise and pass to its outermost position with respect to the turntable.

Of course, during these operations for every movement of the tone arm a record will be deposited upon the turntable which record, however, will not be played inasmuch as the tone arm is removed from the record as soon as it assumes its initial playing position due to the fact that the butterfly mechanism continues to re-engage gears 100 and 94. This operation continues until all of the records in the magazine have been deposited upon the turntable.

At this period, as has been hereinbefore described, the plate 10 and lever 22 move as a unit and consequently the slidable assembly 133 will be displaced. A pin 199 may be positioned upon the upper surface of the extension 134 of the slidable mechanism 133 and said pin is adapted to be engaged by the bifurcated arm 200 which may be pivotally mounted intermediate its length upon the upper surface of the platform 1 as shown best at 201 in Fig. 1. The opposite end of the arm 200 may carry the contacting member 202 which in one position engages the contacting member 203 whereas in the opposite position engages the contacting member 204. In other words, during the shifting of the slidable mechanism 133 the contacting member 202 normally contacting member 203 is shifted to contact with the contacting member 204.

Referring particularly to Fig. 12 wherein schematic diagram of the electrical connections is shown, A and B indicate a source of electric current. Switch 205, which is the control switch of the circuit, may be positioned in one line 206 which connects terminal A to motor M which corresponds to motor 3. Terminal B may be connected by means of 207 to switch 208 operated by switch handle 196. During normal, continuous operation of my device, switch 208 is so positioned as to connect directly to motor 3 through line 209. When switch handle 196 is so positioned as to move the end 198 of rod 197 into contact with arm 72 of the butterfly mechanism 69, switch 208 is positioned in contact with terminal 210 which may connect terminal B by means of line 211 with contacting member 204 which, in turn, is connected by means of line 212 to contacting member 203 normally in contact with contacting member 202 which, in turn, is connected to motor 3 by means of line 213.

When switch 208 is so connected to terminal 210, electrical energy is furnished to motor 3 from contacting member 203 to contacting member 202. However, when the last record in the magazine has been deposited upon the turntable and the tone arm has swung to its initial playing position and gears 100 and 94 have been brought into mesh, plate 10 and lever 22 then acting as a unit shift the slidable mechanism 133. At this period, however, energy to the motor is dependent upon contact between the contacting members 202 and 203 and as soon as said contact is broken, the motor 3 stops. As can readily be seen said contact is broken when turntable 2 has so risen as to thread the records carried upon its surface upon the pin 17 and, hence, the entire machine is rendered inoperative with the turntable thus upraised supporting the records.

To set the apparatus into operation, switch 208 operated by switch handle 196 is so positioned as to directly connect terminal B with motor 3 which, as has been hereinbefore described is the normal continuous operating position.

I claim as my invention:

1. In a phonograph, a rotating shaft, a record turntable slidably mounted upon said shaft, a magazine comprising a shaft positioned above said turntable and normally eccentric with respect to said turntable shaft, means for slidably raising said turntable along said turntable shaft to thread a record from the turntable upon the magazine shaft comprising means for bringing said two shafts into coaxial relationship, and means for offsetting said magazine shaft with respect to the turntable shaft to retain the record in threaded position upon the magazine shaft.

2. In combination, a rotatable shaft, a turntable mounted upon said shaft, a magazine comprising a spindle normally maintained in eccentric position with respect to said turntable shaft, means for moving said spindle into coaxial relationship with said shaft, means for raising the turntable to thread a record from said turntable upon said spindle, and means for offsetting said spindle with respect to said shaft to retain said record upon said spindle.

3. In combination, a rotatable shaft, a turntable mounted upon said shaft, a magazine comprising a spindle positioned above said turntable, a plurality of phonograph records threaded upon said spindle, and means mounted upon said spindle for releasing a record from said spindle and threading it upon the shaft comprising a swingable pin mounted in a slot provided in said spindle, a head carried by said pin of a transverse dimension not greater than an aperture in a phonograph record, a phonograph record threaded on said head, and means for offsetting said head with respect to said spindle and into coaxial relationship with respect to said shaft.

4. In combination, a rotatable shaft, a turntable mounted upon said shaft, a magazine comprising a spindle positioned above said turntable upon which a plurality of phonograph records may be threaded, a swingable pin mounted in a slot provided in said spindle, a head carried by said pin of a transverse dimension not greater than an aperture in a phonograph record and of a thickness less than the thickness of a phonograph record, means for disposing said head into coaxial relationship with said spindle to thread a record from said spindle upon said head, means for disposing said head into coaxial relationship with said shaft to release said record from said head to said shaft.

5. In a phonograph, a rotating shaft, a record turntable slidably mounted upon said shaft, a magazine comprising a laterally movable shaft positioned above said turntable and normally eccentric with respect to said turntable shaft, means for raising said turntable and means for threading a record from the turntable upon the magazine shaft comprising means for bringing said two shafts into coaxial relationship, and means associated with the magazine shaft for offsetting said magazine shaft with respect to said turntable shaft to retain said record in threaded position upon the magazine shaft.

6. In a phonograph, a rotating shaft, a phonograph record turntable mounted upon said shaft, a magazine positioned above said turntable, a tone arm disposed adjacent said turntable, means for swinging said tone arm a normal distance into playing position upon a record of predetermined diameter, and means for shortening the normal length of the arc through which said tone arm travels when a relatively large record is deposited on the turntable from the magazine comprising a rotatable shaft, a connecting rod eccentrically positioned with respect to said shaft, a member carried by said rod operatively associated with said tone arm, means for swinging said member to effectively lengthen said rod with respect to its association with said tone arm, said member swinging means being actuated by the depositing of a record from the magazine to the turntable, and comprising a pivoted lever normally disposed in the path of travel of a relatively large record from the magazine to the turntable.

7. In a phonograph, a rotating shaft, a turntable slidably mounted upon said shaft, a magazine for holding a plurality of records positioned above said turntable for depositing records in seriatim from said magazine to said turntable, means for raising said turntable when all of the records have been removed from the magazine to the turntable, means for retaining said records in said magazine, and automatic means for maintaining said turntable in upraised position supporting said records in said magazine when all of the records in said magazine are played.

8. In a phonograph, a turntable, a motor for driving said turntable, a magazine for phonograph records, means operable by said motor for depositing a plurality of records in sequence from said magazine to said turntable, means operable by said motor for returning said records to said magazine when all said records have been deposited upon said turntable, and means for shutting off said motor when said records have been returned to the magazine comprising, electrical connections to said motor, a manually operated three pole switch interposed in one connection, one pole of which connects the motor directly to a source of current, the other pole of which connects the source of current through a circuit breaker to the motor, and means for actuating said circuit breaker to break the circuit when said records are returned to the magazine from the turntable.

9. In combination, an automatic phonograph comprising a turntable, a tone arm disposed adjacent said turntable, a rotatable member upon which said tone arm is mounted, an arm upon said rotatable member, a pin mounted upon said last mentioned arm, a link movable adjacent said arm, said link being provided with an aperture in which said pin is inserted, the defining edge of said aperture being adapted to contact said pin and move said arm, and means for changing the dimension of the aperture in the direction of travel of said link.

BENJAMIN L. GATES.